United States Patent [19]
Gorshe

[11] Patent Number: 5,412,651
[45] Date of Patent: May 2, 1995

[54] STRUCTURE AND METHOD FOR COMBINING PCM AND COMMON CONTROL DATA ON A BACKPLANE BUS

[75] Inventor: Steven S. Gorshe, Beaverton, Oreg.

[73] Assignee: NEC America, Inc., Hillsboro, Oreg.

[21] Appl. No.: 16,403

[22] Filed: Feb. 11, 1993

[51] Int. Cl.⁶ .......................................... H04L 12/407
[52] U.S. Cl. .................................. 370/85.9; 370/85.6; 370/85.11; 370/100.1
[58] Field of Search .................... 370/85.9, 85.11, 85.6, 370/100.1

[56] References Cited

U.S. PATENT DOCUMENTS

| | | | |
|---|---|---|---|
| 4,596,025 | 6/1986 | Satoh | 370/100.1 X |
| 4,608,700 | 8/1986 | Kirtley, Jr. et al. | 370/85.1 X |
| 4,922,244 | 5/1990 | Hullet et al. | 370/85.11 X |
| 5,079,763 | 1/1992 | Chao et al. | 370/85.6 |
| 5,124,981 | 6/1992 | Golding | 370/85.1 |

Primary Examiner—Douglas W. Olms
Assistant Examiner—Russell W. Blum
Attorney, Agent, or Firm—Skjerven, Morrill, MacPherson, Franklin & Friel; Edward C. Kwok

[57] ABSTRACT

A method for transporting common control data on a backplane bus under the SONET standard uses the section and line overhead bytes. A unit is assigned a predefined number of time slots during in the STS-1 synchronous payload envelope to assert a data transmission request on a request/acknowledge bus. Each unit keeps queue and count-down counters for monitoring, respectively, the total number of pending packets in the system and the number of packets ahead of the unit's own queued transmission. This method is implemented on a PCM bus using a transmission circuit and a receiving circuit.

19 Claims, 9 Drawing Sheets

STRUCTURE AND METHOD FOR COMBINING PCM AND COMMON CONTROL DATA ON A BACKPLANE BUS

CROSS REFERENCE TO RELATED APPLICATIONS

This application relates to a copending U.S. Patent Application entitled "Digital Loop Gain System," by Steven Gorshe and Hitoshi Sato, Ser. No. 07/966,335, filed Oct. 26, 1992, now U.S. Pat. No. 5,355,362, which is hereby incorporated by reference in its entirety.

BACKGROUND OF THE INVENTION

1. Field of the Invention

The present invention relates to a method for data communication between computational equipment sharing a backplane bus; and, in particular, relates to computational equipment which are part of network under the SONET (Synchronous Optical Network) communication standard, using mainly optical fibers as data transmission media.

2. Discussion of Related Art

Optical fibers provide a high bandwidth medium for data transmission. Consequently, optical fibers have found applications in many computer networks, including those used in digital telephone systems. To allow a uniform interface for voice and computer equipment on an integrated voice and computer network using optical fibers, American National Standards, Inc. adopted a standard, known as SONET (Synchronous Optical Network). The SONET standard is described in "American National Standard for Telecommunications—Digital Hierarchy—Optical Interface Rates and Formats Specification (SONET)" ("SONET document"), which is hereby incorporated by reference in its entirety. The SONET document defines a hierarchy of data formats to support a layered communication architecture, which comprises the photonic, section, line and path layers. A schematic model of the layered architecture is provided in FIG. 1. Each of these layers, except the photonic layer, builds on services provided by the next lower layer.

The basic data unit of the SONET standard is represented by a frame, called the STS-1 frame, consisting of 90 "columns" and 9 "rows" of 8-bit bytes. The STS-1 frame is shown graphically in FIG. 2. Under the fixed transmission rate, the STS-1 frame is transmitted in 125 microseconds. Under the SONET standard, as shown in FIG. 2, data of an STS-1 frame are transmitted row by row, and from left to right. In each byte, the most significant bit is transmitted first.

To support the layered architecture, the first three columns of the STS-1 frame are used for carrying transport overhead information, and the remaining 87 columns of the frame, known as the STS-1 Synchronous Payload Envelope (SPE), carry the data to be transported. Path layer overhead are also carried in the STS-1 SPE. FIG. 3 shows the allocation of the transport and path overheads in the STS-1 frame. A description of each of the overhead bytes is provided in the SONET document and is therefore omitted from this discussion.

The SONET standard also defines (i) data formats which are each smaller than an STS-1 frame and transported within the STS-1 SPE, called virtual tributaries (VT); and (ii) data formats, designated as STS-N frames (where N is an integer), which are each larger than a STS-1 frame. An STS-N frame is formed by byte interleaving N STS-1 frames. The counterparts of the STS-1 and STS-N data formats in the optical fibers are called OC-1 and OC-N (optical carrier level 1 and optical carrier level N) respectively. OC-1 and OC-N are obtained by optical conversions of the respective STS signals after scrambling.

A rough description for each of the layers in the SONET architecture is provided here to facilitate understanding of the present invention. The photonic layer provides transport of bits at a fixed bit rate (51.84 megabits/second) across the physical medium, i.e. the optical fibers. The main function of the photonic layer is the conversion between the STS signals and the OC signals.

The section layer deals with the transport of an STS-N frame across the physical medium. In this layer, framing, scrambling, section error monitoring are provided. An equipment which terminates in the section layer reads, interprets and modifies the section overhead bytes of the STS-1 frame.

The line layer deals with the reliable transport of the path layer payload. A path is a basic unit of a logical point-to-point connection between equipment providing a service on the network. More than one path layer payload, each typically having a data rate less than the STS-1 basic data rate, can share an STS SPE. The line layer synchronizes and multiplexes for the path layer. The overhead bytes for the line layer include overhead involved in maintenance and protection (i.e. error recovery and redundancy) purposes. An equipment which terminates in the line layer reads, interprets and modifies the line layer overhead bytes of the STS-1 frame.

The path layer deals with the transport of services between path terminating equipment. Examples of such services include synchronous and asynchronous DS-1 services and video signals. The main function of the path layer is to map the services into the format required by the line layer.

An architecture, which is found in many computer systems, consists of a backplane bus shared by the computational units of the computer. This backplane bus is the means by which computational units on the backplane communicate local system functions, including such functions as diagnostics, or integration of a backup unit in case of a failure. In many systems, e.g. a telephone switch or multiplex equipment which transmits and receives pulse code modulation (PCM) data, data communication with computers outside of the backplane are performed on a separate medium from the local data traffic. In such a system, especially one required to service data traffic at the bandwidth of the SONET standard, the communication protocol used on the backplane bus can be an important factor in achieving the fast response time necessary to support data transactions such as protection switch requests, or dynamic bandwidth assignments.

For telephone switches, a protocol on the backplane bus based on a polling algorithm is inherently slow. While a protocol based on an interrupt protocol may satisfy the bandwidth requirement, such protocol requires a large number of interrupt and arbitration lines. Other protocols, such as the distributed arbitration techniques used in MultiBus and NuBus systems, are sufficiently "fair" in terms of providing equal access to units requesting the use of the bus. However, these other protocols do not provide the first-in-first-out behavior when bus requests from the various computational units on the backplane arrive in a non-predictable manner, and require too many additional signals to the backplane.

Other desirable qualities lacking in the prior art protocols, include ease of implementation, a unified bus for both data and local control traffic, and flexibility in message format and message lengths.

SUMMARY OF THE INVENTION

In accordance with the present invention, a protocol and structures for implementing such protocol are provided in a synchronous communication unit. This synchronous communication unit accesses a synchronous bus and a request/acknowledge line. Under this protocol, the synchronous communication unit is provided a queue counter and a Count-down counter. The synchronous communication unit continuously monitors the request/acknowledge line for packet request signals and packet acknowledge signals asserted on the request/acknowledge line. Whenever a packet request is detected on the request/acknowledge line, a count in the queue counter is incremented. Whenever a packet acknowledgement, indicating a successful transmission of a data packet, is detected the count in the queue counter and a count in the count-down counter are decremented.

When the computational unit wishes to send data, it asserts on the request/acknowledge line, during one of a number of predetermined time slots, a request to send data. At the same time, the count in the queue counter is transferred to the count-down counter. When the count in the count-down counter reaches zero, the computational unit begins transmitting a data packet on the synchronous bus during a second set of predetermined time slots. The computational unit provides on said request/acknowledge line an end-of-message signal during the time slot when the last byte of the data packet is transmitted. This end-of-message signal allows transmission of data packets of indefinite length.

In one embodiment of the present invention, the computational unit provides as the last byte of a data packet an error detecting code based on the previous content of the data packet, so as to allow the recipient of the packet to determine if the data packet is correctly received.

The computational unit detects a beginning of a data packet by monitoring data transmitted on the synchronous bus. From the beginning of the data packet, the computational unit determines if it is the intended recipient of the data packet by examining an address included in the beginning of the data packet. If so, the data packet is received into a data buffer for further processing.

In one embodiment of the present invention, the assigned time slots for packet requests are allocated from a payload envelope under the SONET standard. The data packet are transmitted during time slots allocated from an overhead portion outside of the payload envelope.

In one embodiment, the assigned time slots for packet requests are each associated with a queue with an assigned priority. In that embodiment, a separate set of queue and count-down counters are provided for each queue.

There are several advantages of the protocol in the present invention over polling and interrupt driven protocols. The protocol in accordance with the present invention does not incur, unlike polling protocols, a delay associated with the polling cycle latency. Further, the protocol of the present invention does not incur, unlike interrupt driven or polling protocols, a delay associated with the common unit writing a command message to a low speed interface unit requesting a response message. In accordance with the present invention, whenever a unit requires data transfer, a request to send data is dispatched almost immediately at next one of the unit's assigned time slots. It has been estimated that the protocol of the present invention is 2.5 to 90 times faster than polling or interrupt driven protocols. Real time requirements on the common control unit's processor is also reduced, since the processor is not involved with the message transaction until the packet from the low speed interface unit is correctly received into the memory space of the common control unit.

The present invention is better understood upon consideration of the detailed description below and the accompanying drawings.

DETAILED DESCRIPTION OF THE PREFERRED EMBODIMENTS

One embodiment of the present invention is provided in an integrated digital loop carrier (IDLC), which interfaces directly or indirectly into a local digital switch (LDS), in accordance with the requirements of Bellcore technical report TR-TSY-000303, published by Bellcore, 445 S. Street, Rm 2J-125, P.O. Box 1910, Morristown, N.J. 07962-1910. The interface to the local digital switch is referred to, in the above-mentioned BellCore technical report, as an integrated digital interface (IDT).

Figure 4:
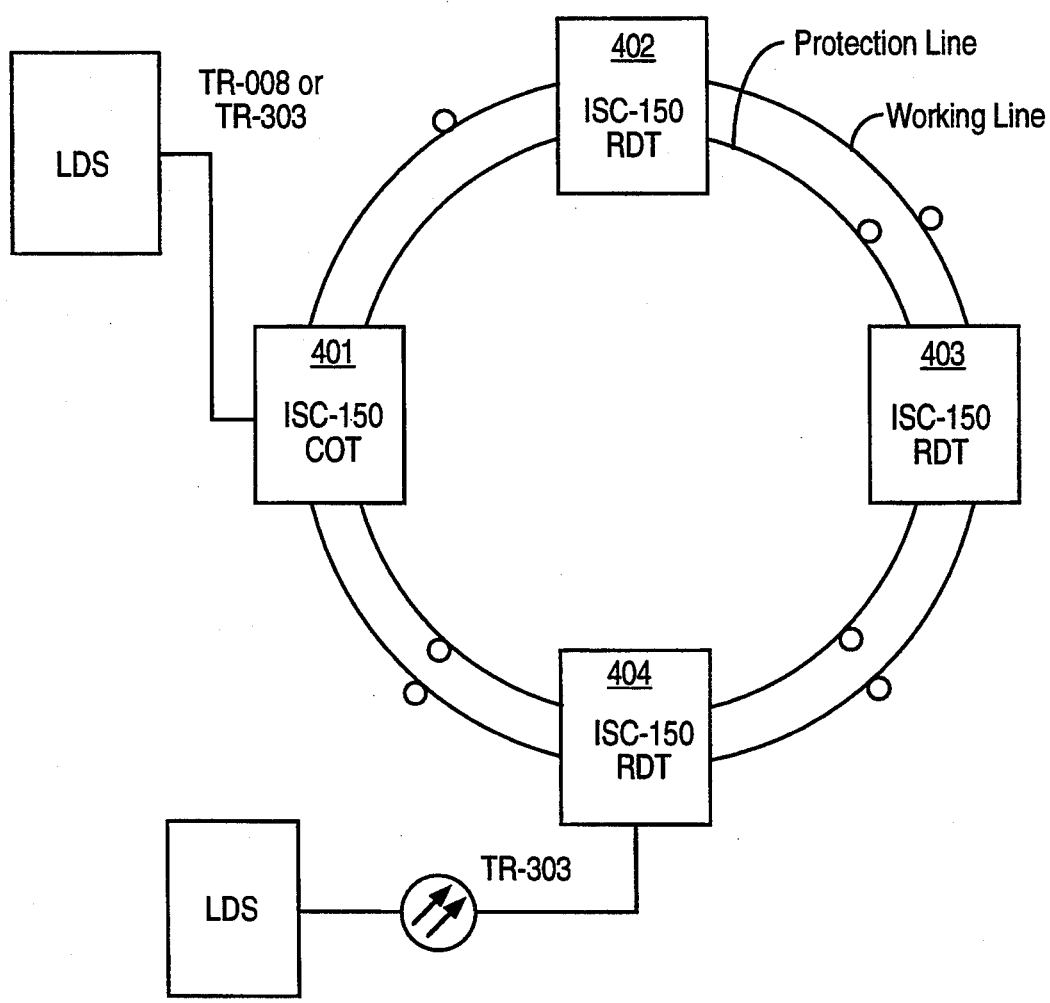
FIG. 4 shows IDLCs connected in a ring configuration; the IDLCs shown embody the present invention.

One configuration for connecting the DLCs is shown in FIG. 4. As shown in FIG. 4, an IDLC 401 acts as a central office terminal (COT) which has a TR-TSY-000303 IDT, and is connected to remote digital terminals (RDTs) 402–404 in a ring configuration to form a local terminal network. Subscriber equipment are interfaced to RDTs 402–404. As shown in the FIG. 4, an IDLC (e.g. RDT 404) configured as an RDT can also be interfaced to a LDS via a TR-TSY-000303 IDT. RDT 404 can act as a COT should COT 401 fails.

An IDLC of the present embodiment includes a common shelf modules for performing "common functions" and one or more service definition modules (SDMs) which are computational units containing interfaces to subscribers of the telephone system. The common functions include common channel signalling (CCS) processing, such as ringing and dialling signals. Each SDM provides a generic backplane interface for a variety of equipment which provide signals to be interfaced into the telephone network. Such equipment may provide data from different sources, in different formats, using various physical representations. Such data include analog voice frequency signals, DS0, DS1, DS2, DS3, STS-1, OC-1, Ethernet or other medium speed local area networks, fiber to the curb or home (FTTC/FTTH) links and personal communication network links. To provide continuous uninterrupted operation, the units in the common shelf module are typically each provided a redundant or back-up unit for protection.

SDMs also provide local common control for such functions as common channel signalling, provisioning and alarm and status monitoring. By provisioning is meant the process of setting an interface's parameters, such as the bandwidth, the analog signal levels, and the bit error rate threshold for raising an alarm condition.

The SDM backplane is divided into three groups, so that the STS-3 rate signal can be partitioned on an STS-1 basis among the low speed groups. The low speed groups may then share the bandwidth of an STS-1 signal.

The common module within an IDLC of the present invention performs those functions best performed in a common location. The units in the common module act as the masters of the counterparts of the functions in the SDMs such as common channel signalling, and system performance and alarm monitoring, and provisioning. In the present embodiment, there are ten PCM data buses in the common module. Three of these buses are used in the portion of the common module which processes data received from the SDMs, five buses are used for interfacing with high-speed subscriber interfaces, one bus is common to the portions of the common module servicing high-speed and low-speed interfaces, and a spare bus. Each of these buses are 24-bit wide and operates at a clock rate of 6.48 Mhz to provide an STS-3 data rate. Each of the PCM data buses uses, in accordance with the present invention, a protocol to be described in further detail below in conjunction with the SDM backplane bus.

As indicated above, the SDMs contain the units for low speed interfaces to the subscribers and local common control functions. The low speed interface units provide interfaces for voice frequency (VF) connections, such as POTS (i.e. plain old telephone service) and other applications described above. In each SDM, three sets of 8-bit PCM buses each having an STS-1 data rate are provided. Each set of buses comprises a transmit and a receive bus, and services one of three low speed groups. Each SDM connects into the common module by an STS-3 data bus which comprises three STS-1 data bus. If the SDM is totally populated with VF channel units (CHUs), all three PCM buses would generally be connected to the same STS-1 data bus.

Figure 5:
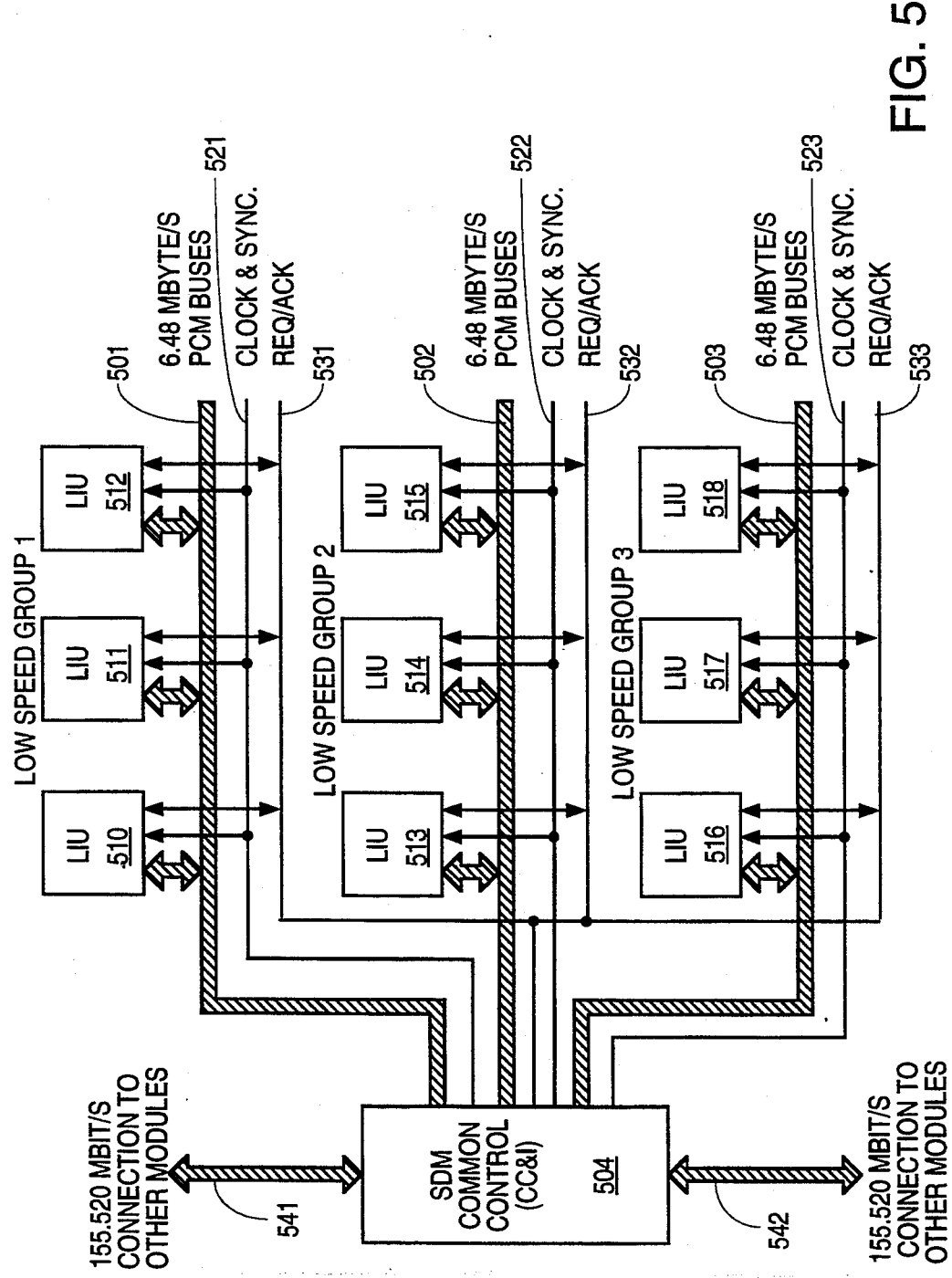
FIG. 5 shows PCM bus sets 501–503 and a SDM common control unit 504 in an SDM of the present embodiment.

FIG. 5 shows PCM bus sets 501–503 and a SDM common control unit 504 in an SDM of the present embodiment. As shown in FIG. 5, low speed interface units (LIUs) 510–512, 513–515, and 516–518 are connected respectively to PCM bus sets 501–503. Each set of PCM buses is provided a "request and acknowledge" line ("req/ack") line, i.e. one of lines 531–533, in accordance with the bus protocol ("backplane common data protocol") of the present invention described below. Common control unit 504 is connected to the common control units of other SDMs on the buses 541 and 542. Buses 541 and 542 each operate at the STS-3 rate. During unused time'slots, common control unit 504 sets the PCM value to all 1's, to allow another SDM to AND its PCM data into the unused time slot. Of course, the setting of PCM data to all 1's can also be performed in the backplane.

Figure 1:
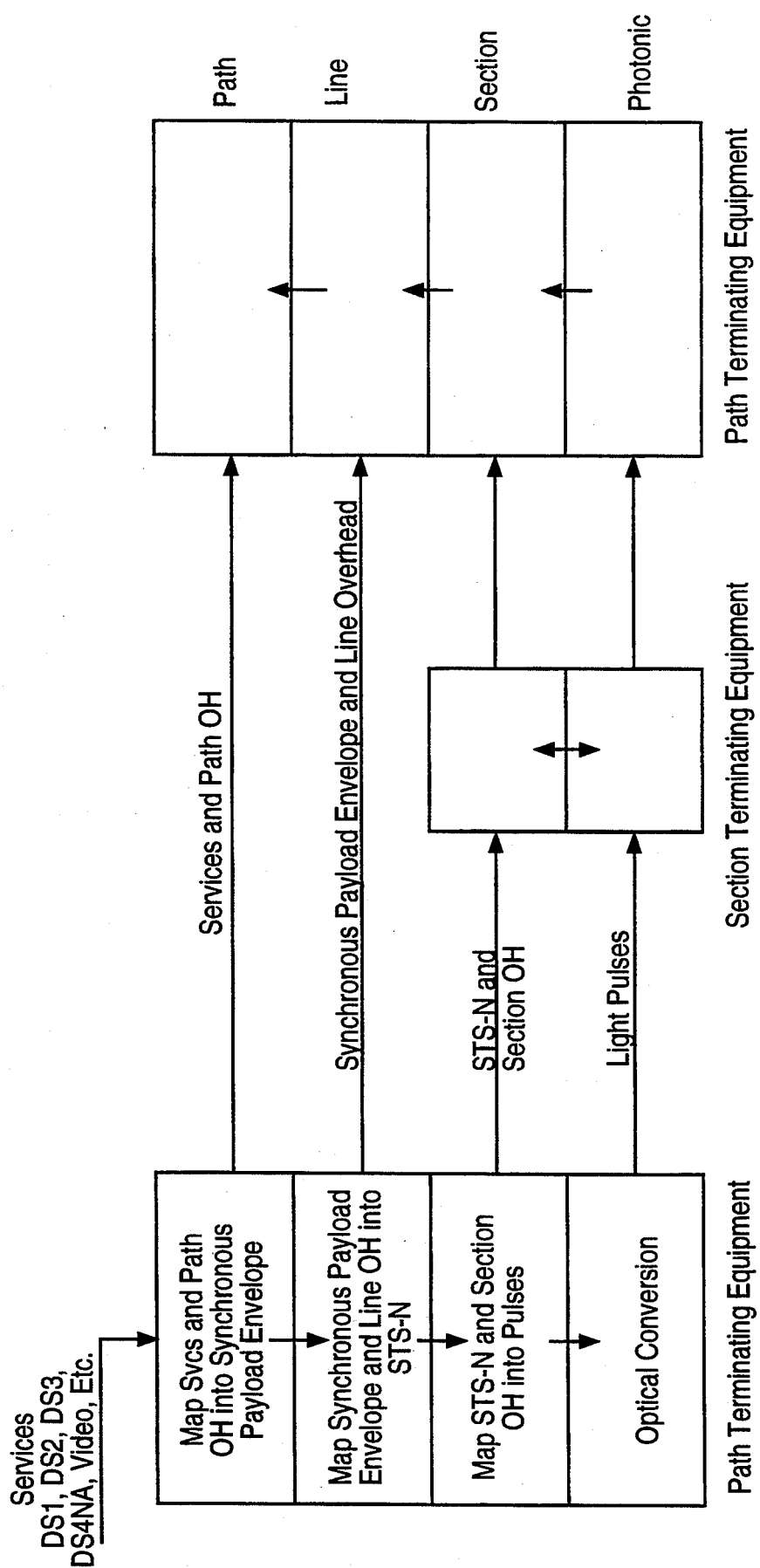
FIG. 1 is a schematic model of the SONET standard, showing the layered architecture implemented in two communicating computational units.
Figure 2:
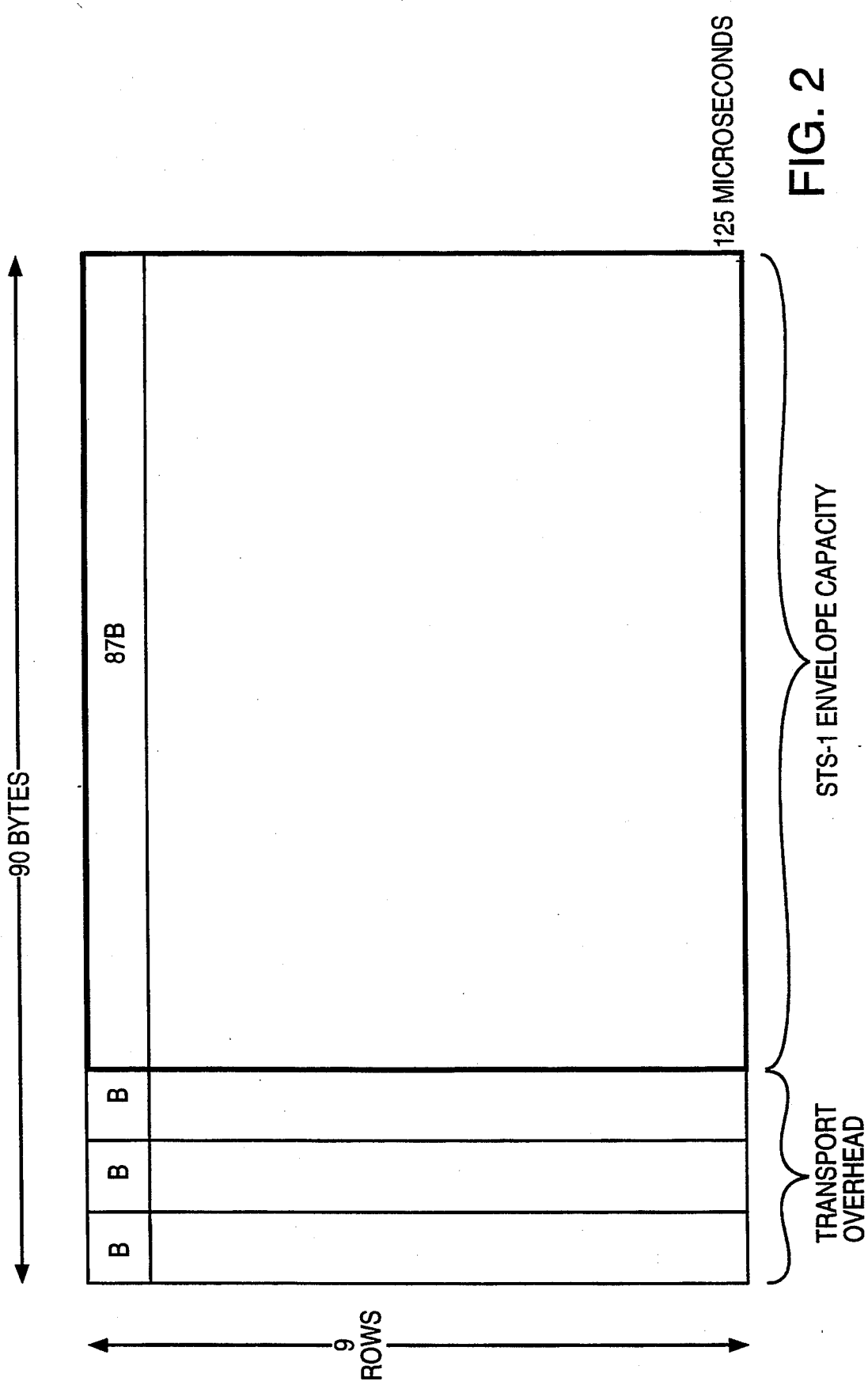
FIG. 2 shows the format of an STS-1 frame.
Figure 3:
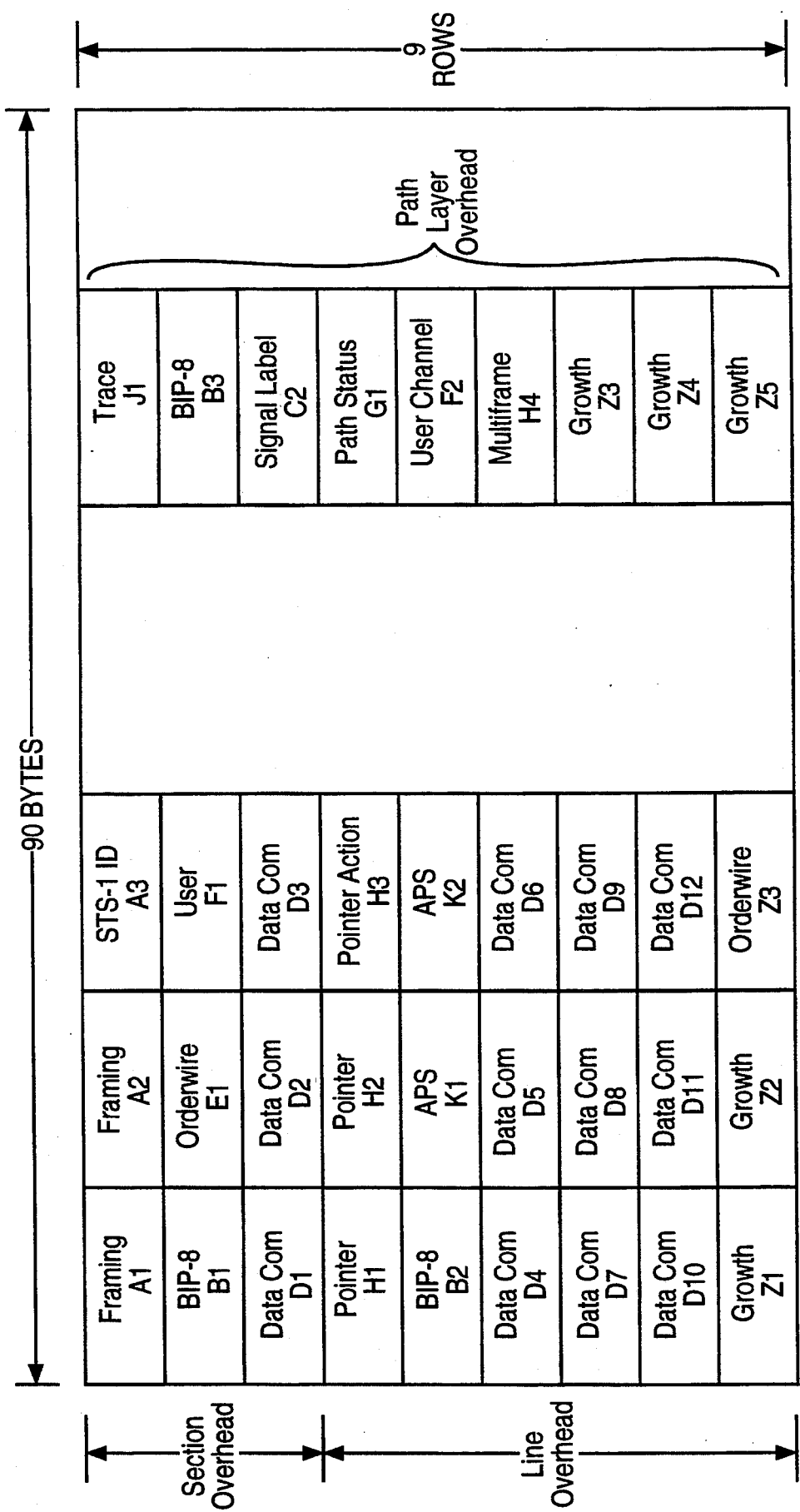
FIG. 3 shows the allocation of transport and path overhead bytes in the STS-1 frame.

The system's overhead data messages, and common channel signalling information between the channel units (e.g LIUs 510–518) and the common control unit 504 are passed on the SDM backplane using the SONET section and line overhead time slots. Specifically, the section overhead bytes A1, A2, B1, C1 and D1–D3 and line overhead bytes B2, D4–D12, K1, K2, Z1 and Z2 are used (see FIG. 3). These bytes can be used by the SDM backplane buses since the SDM is a section and line terminating device. The data so transferred are known as "common data." Bytes E1, E2, and F1 are excluded currently to provide a simple means for terminating orderwire and user data traffic from OC-1 units in the SDM. The H1, H2 and H3 bytes are reserved to provide a means for communicating pointer adjustments in an STS-N frame.

In this embodiment, the transmit PCM bus is chosen for common data transfer since the transmit PCM can be used as a bidirectional bus for data communication without additional interface circuitry. Under the backplane common data protocol of the present invention, only a single req/ack (e.g. any one of req/ack lines 531–533) is necessary to support common data transport. Each unit in the SDM, e.g. any of LIUs 510–518, or SDM common control unit 504, is allocated a unique card slot number which is hardwired in the connector on the backplane.

Under the present invention, each card slot is assigned, based on the address of the card slot, four unique time slots within the STS-1 frame. For example, the unit with card slot address 0 is reserved the time slots 6, 186, 366 and 546. Likewise, the units with card slot addresses 1–84, are reserved, in order of their respective card slot addresses, time slots 7–90, 187–270, 367–450 and 547–630. However, if the number of units exceeds 85, the unit with card slot address 85 are reserved time slots 96, 276, 456 and 636. This is because time slots 1–5, 181–185, 271–275, 361–365, 451–455, 541–545, 631–635, and 721–725 are reserved for end-of-packet indication. Time slots 730–810 are reserved for special control functions.

Each unit in the SDM has a queue counter and a countdown counter. The queue counter keeps a count of the number of common data packet requests pending at the PCM bus. The count-down counter keeps a count of the number of common data packet requests ahead of the unit's own packet request. Since each unit is assigned four time slots within an STS-1 frame, four packet requests can potentially be made during an STS-1 frame. When a unit wishes to send a packet, a packet request is made during one of its assigned time slots in the STS-1 frame by asserting req/ack signal on the req/ack line (e.g. FIG. 5's req/ack line 531–533)

associated with the PCM bus. At the same time, the requesting unit transfers the content of its queue counter into the count-down counter. Since all units monitors the req/ack line, each unit increments its queue counter whenever a packet request is detected on the req/ack line.

Whenever a packet is successfully sent and acknowledged (acknowledgement of receipt of a common data packet is discussed below) on the PCM bus, each unit decrements both its queue and count-down counters. A unit may transmit its common data packet at the next available overhead time slot when its queue counter reaches zero. The end of the common data packet transmission is indicated by the unit asserting the req/ack signal on the req/ack line during the time slot the last byte of the packet is transmitted on the PCM bus. Each packet contains an error detection code for the receiving unit to verify if the packet is correctly received. The receiving unit acknowledges receipt of the packet by asserting the req/ack signal on the req/ack line during the second time slot after the end-of-packet is indicated. Retransmission is required when an acknowledgement signal is not asserted during the time slot it is expected.

Figure 6:
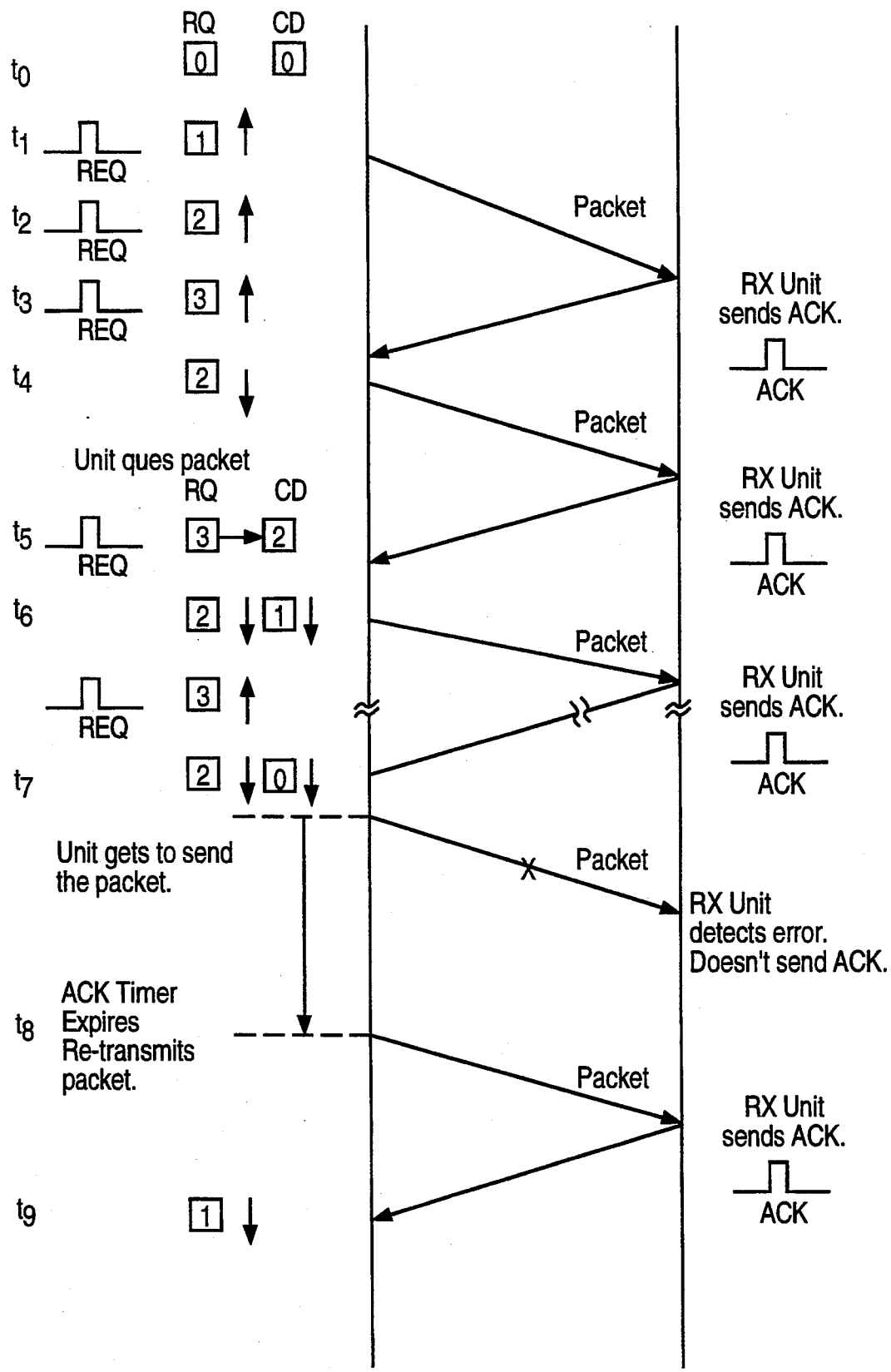
FIG. 6 is a timing diagram showing the operation of the backplane common data protocol, in accordance with the present invention.

FIG. 6 illustrates the operation of the backplane common data protocol. FIG. 6 shows a unit's—say, A'-s—queue (represented by boxes in column RQ) and count-down (represented by boxes in column CD) counters during a time period between $t_0$ and $t_9$. As shown in FIG. 6, at time $t_0$, both A's queue and count-down counters are zero. At times $t_1$ to $t_3$, three packet requests are detected on the req/ack line. Accordingly, A's queue counter is incremented at each detection of a packet request. During the overhead time slots following the detection of the packet request at time $t_1$, the requesting unit begins transmitting the common data packet. The transmission of the first common data packet completes at time $t_4$, when the end-of-packet is signalled and the receiving unit acknowledges the correct receipt of the common data packet. Accordingly, at time $t_4$, A's queue counter is decremented.

At time $t_5$, A sends a packet request by asserting the signal on the req/ack line. At the same time, the content of A's queue counter is transferred to A's count-down counter. At time $t_6$, the completion of another packet transmission decrements both A's queue and count-down counters At time $t_7$, A's count-down counter reaches zero, allowing A to send its packet at the next available overhead time slot. At time $t_8$, the packet sent by A is not acknowledged. Accordingly, A retransmits its common data packet, which is acknowledged at time $t_9$.

Figure 7:
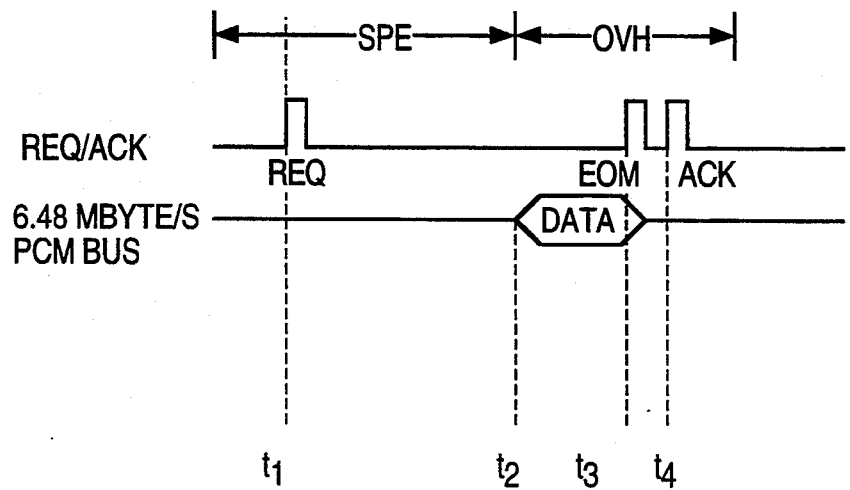
FIG. 7 summarizes the events associated with the transmission of a common data packet.

FIG. 7 summarizes the events relating to a common data packet's queuing and transmission. As shown in FIG. 7, a packet request is issued at time $t_1$, which is a time slot within the SPE portion of the STS-1 frame. Packet transmission occurs during the period $t_2$ to $t_3$, which correspond to the transport (i.e. section and line) overhead portion of the STS-1 frame. The end-of-packet and the acknowledge signals are also sent during the overhead portion of the STS-1 frame at time $t_3$ and $t_4$.

Each of the four time slots associated with each unit may be associated with four priority queues for four packet priority levels. In that situation, each unit is provided with four queue counters and four count-down counters. A unit transmits a previously queued packet of a given priority only when its countdown counter for that priority reaches zero, and all higher priority queue counters are zero. In one implementation, the highest priority queue is designated for protection switch requests, the second highest priority queue is designated for dynamic bandwidth assignment requests, and the remaining queues are used for all other common data transactions.

Common control unit 504 uses the time slots 730, 732, 734 and 736 to signal, respectively, an empty queue condition in each of four priority queues, and to resynchronize all units, without regard to whether packet requests are pending. Whenever an empty queue condition is detected, common control unit 504 asserts the req/ack line. Upon receiving the resynchronization signal on the req/ack line at any one of time slots 730, 732, 734 and 736, each unit resets the appropriate queue counter and count-down counters to zero. Units having pending packet requests are responsible for reasserting the packet requests after resychronization.

Error conditions occur when (i) a noise spike causes a false packet request signal to be asserted on the req/ack line, (ii) a faulty unit fails, at its turn, either to transmit a previously requested packet, or to provide an end-of-packet signal, or (iii) a receiving unit fails to acknowledge a transmitted packet. Common control unit 504 monitors the req/ack line for such error conditions. If there have been over 300 overhead time slots since the last acknowledgement is signalled on the req/ack line, common control unit 504 signals an error condition at time slot 740. In response to the error condition, each unit decrements the highest priority nonzero queue and count-down counters. When a unit's highest priority count-down counter reaches zero, it may transmit a data packet at the next available overhead slot of the next STS-1 frame.

When a new unit is introduced into the system, the new unit monitors time slots 730, 732, 734 and 736 for the empty-queue or resynchronization signals. For that unit, when an empty-queue or a resynchronization signal is received, normal queue counting operation begins for the appropriate queue and count-down counters. When all queues are thus synchronized, a message is sent to SDM common control unit 504 to register the "on-line" status of the unit.

One of ordinary skill will appreciate that the present protocol allows broadcast messages to be sent to more than one intended recipient. Such broadcast messages are useful for such functions as roll call, status inquiry, and protection switching. In the situation of a protection switching, a control unit snoops the synchronous bus for a protection switch message, and enables the stand-by unit to assume the time slots assigned to the replaced failed unit.

Figure 8:
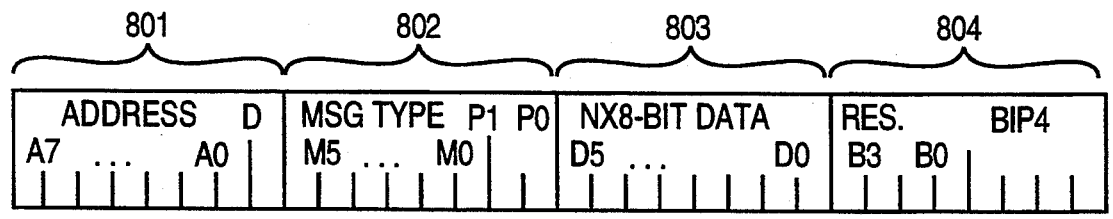
FIG. 8 shows the format of a common data packet.

FIG. 8 shows the format of a common data packet used in the present embodiment. As shown in FIG. 8, the common data packet comprises (i) an 8-bit address field 801, which includes a direction bit D, (ii) a 8-bit message type field 802, which includes a 2-bit priority, (iii) a data field 803 of indefinite length, and (iv) an error detection code field 804. In this embodiment, the address field indicates the card slot address of the recipient unit, when the common data packet originates from a common unit (indicated by the D bit being set to 1). Otherwise, when the common data packet originates from a low speed interface unit to the common control unit (indicated by the D bit being set to 0) the address field indicates the card slot address of the unit which is the source of the packet. When the packet originates from a low speed interface unit, the intended recipient, which is a common unit, is encoded in the message type field 802. Thus, each common unit examines the message type and priority fields of message type field 802 to verify that it is the intended recipient. Under this scheme, the low speed interface units are addressed by their card slot addresses, and the common units are addressed both by their card slot addresses and the priority of a message type.

Figure 9:
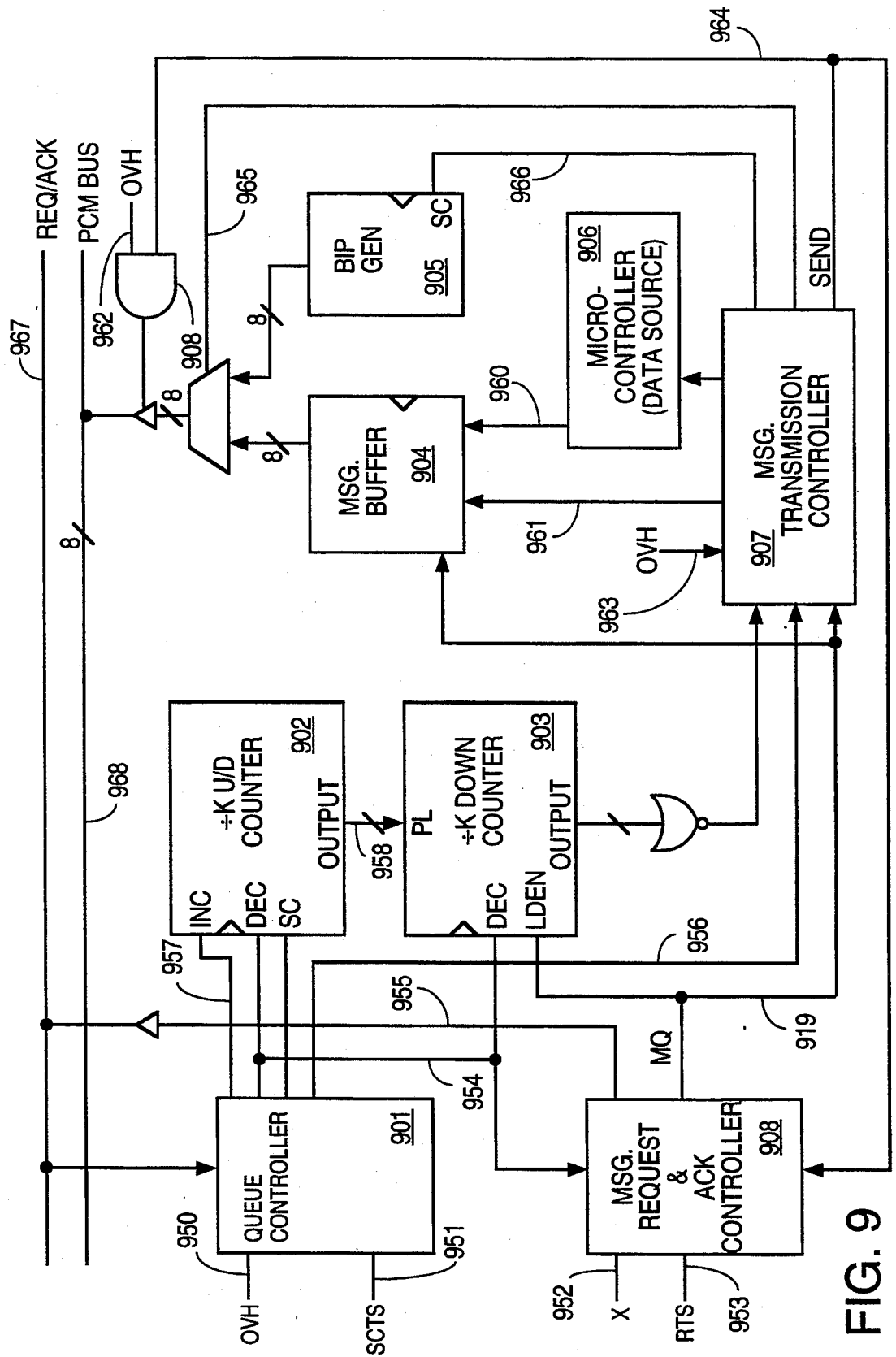
FIG. 9 shows a block diagram of a circuit for transmitting a common data packet in accordance with the protocol of the present invention.

A message transmit circuit 900 for implementing in one of the low speed interface unit the backplane common data protocol described above is shown in FIG. 9. As shown in FIG. 9, a control state machine 901 ("queue controller") monitors and receives signal req-/ack on line 967, a signal OVH on line 950 and a signal SCTS on line 951. Queue controller 901 provides (i) the control signals, represented by lines 958, 957 and 954, for initializing, incrementing or decrementing, respectively, the queue counter or counters, which are represented by counter block 902; and (ii) the control signal or signals for decrementing the count-down counter or counters, which are represented by counter block 903. Signal OVH on line 950 is asserted during the overhead time slots allocated for common data transfer. Signal SCTS on line 951 is asserted when a synchronization signal is received from a common unit.

Another state machine 908 ("message request and acknowledge controller"), which receives signals X and RTS on line 952 and 953 respectively, asserts the req-/ack signal on the req/ack line 967 to initiate a packet request or to indicate the transmission of the last byte in a packet. Signal X, which is provided by microcontroller 906, directs message request and acknowledge controller 908 to assert the req/ack signal on line 967. Signal RTS is asserted during any one of the four time slots assigned to the low speed interface unit. Message request and acknowledge controller 908 provides a signal MQ, which directs a down-counter in counter block 903 to receive the value on the output bus 959 of the counter block 902, when a packet request is queued. Signal MQ is also provided to message transmission controller 907 to register that a packet is queued for transmission.

Microcontroller 906 writes into message buffer 904 the packet to be transmitted. When the count-down counter reaches zero, message transmission controller 907 causes the content of message buffer 904 to be output onto PCM bus 968 during the next available overhead time slots. BIP generator 905 provides an error detection code sent as the last byte of a packet, so as to allow the recipient to determine whether the packet is correctly received. In this embodiment, a bit interleaved parity type error detection code is provided. Message transmission controller also provides a signal to message request and acknowledge controller 908, directing message request and acknowledge controller 908 to assert the end-of-packet signal on req/ack line 967.

Figure 10:
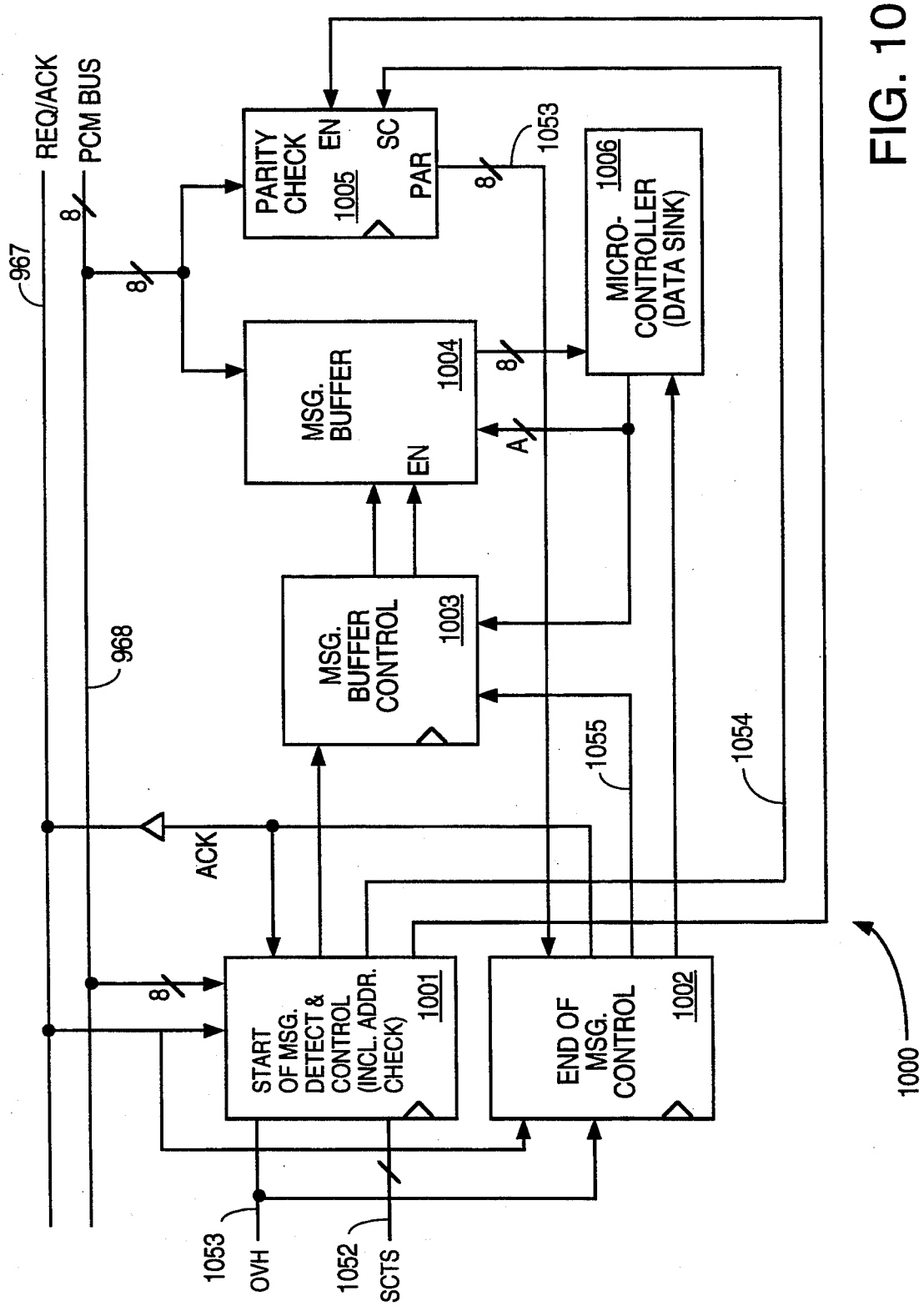
FIG. 10 shows a block diagram of a circuit for receiving a common data packet in accordance with the protocol of the present invention.

FIG. 10 is a block diagram of a message receive circuit 1000 for implementing, in a low speed interface unit, the backplane common data protocol described above. As shown in FIG. 10, control unit 1001 monitors PCM bus 968 to detect the start of a data packet and verifies the address field of the data packet against the low speed interface unit's own slot address provided on bus 1052. Again, signal OVH is asserted during the overhead time slots assigned for common data transmission.

Buffer control unit 1003 enables message buffer 1004 to receive the common data packet from PCM bus 968. Buffer control unit 1003 ensures that the previous packet is processed by microcontroller 1006 prior to receiving the next packet from PCM bus 968. Parity check unit 1005 ensures that the packet is correctly received by computing the error detection code independently and then comparing the computed error detection code against the error detection code embedded in the packet received. A signal is sent on line 1053 to end-of-message control unit 1002 to indicate that the common data packet is correctly received. End-of-message control unit 1002 then asserts the acknowledgement signal on req/ack line 967 and signals microcontroller 1006 on line 1054 of a ready packet in message buffer 1004. If the packet is not correctly received, end-of-message control unit 1002 signals message buffer control unit 1003 on line 1055 to deallocate the space in message buffer 104 occupied by the corrupt packet.

There are several advantages of the protocol in the present invention over polling and interrupt driven protocols. In polling protocols, a delay is associated with the polling cycle latency. In both interrupt driven and polling protocols, a delay is associated with the common unit writing a command message to a low speed interface unit requesting a response message. However, no delay is associated with the protocol of the present invention. Whenever a unit requires data transfer, a request to send data is almost immediately sent at the next one of its assigned time slots. It has been estimated that the protocol of the present invention is 2.5 to 90 times faster than polling or interrupt driven protocols. Real time requirements on the common control unit's processor is also reduced, since the processor is not involved with the message transaction until the packet from the low speed interface unit is received in the memory space of the common control unit.

Although the present invention is described in the above detailed description using as an example a telephone application, the present invention is not so limited. The present invention is applicable in general to any synchronous communication system. Numerous variations and modifications within the scope of the present invention are possible. The present invention is defined by the following claims.

I claim:

1. A synchronous communication method for use in a computational unit having access to a synchronous bus and a request/acknowledge line, comprising the steps of:

providing a queue counter and a count-down counter;

monitoring said request/acknowledge line for packet request signals and packet acknowledge signals asserted on said request/acknowledge line and (i) incrementing a count in said queue counter, whenever a packet request is signalled on said request/acknowledge line and (ii) decrementing said count in said queue counter and a count in said count-down counter, whenever a packet acknowledge signal is asserted on said request/acknowledge line;

asserting on said request/acknowledge line, during one of a first plurality of predetermined time slots, a request to send data, said predetermined time slot being uniquely assigned to said computational unit, and transferring said count in said queue counter to said count-down counter; and transmitting a data packet on said synchronous bus during a second plurality of predetermined time slots when said count in said count-down counter reaches zero.

2. A method as in claim 1, further comprising the step of asserting on said request/acknowledge line an end-of-message signal during the time slot when the last byte of said data packet is transmitted.

3. A method as in claim 1, further comprising the steps of:
computing an error detecting code based on the content of said data packet; and
transmitting said error detecting code as the last byte in said data packet.

4. A method as in claim 1, further comprising the steps of:
detecting a beginning of a data packet by monitoring data transmitted on said synchronous bus;
determining from said beginning of a data packet an address representing a recipient of said data packet;
verifying that said address identifies said computational unit; and
receiving said data packet into a data buffer when said address identifies said computational unit.

5. A synchronous communication method for use in a computational unit having access to a synchronous bus and a request/acknowledge line, comprising the steps of:
providing a queue counter and a count-down counter;
monitoring said request/acknowledge line for packet request signals and packet acknowledge signals asserted on said request/acknowledge line and (i) incrementing a count in said queue counter, whenever a packet request is signalled on said request/acknowledge line and (ii) decrementing said count in said queue counter and a count in said count-down counter, whenever a packet acknowledge signal is asserted on said request/acknowledge line;
asserting on said request/acknowledge line, during one of a first plurality of predetermined time slots, a request to send data, and transferring said count in said queue counter to said count-down counter; and
transmitting a data packet on said synchronous bus during a second plurality of predetermined time slots when said count in said count-down counter reaches zero; wherein said first plurality of predetermined time slots are allocated from a payload envelope under the SONET standard, and said second plurality of predetermined time slots are allocated from an overhead portion outside of said payload envelope.

6. A synchronous communication structure for use in a computational unit having access to a synchronous bus and a request/acknowledge line, comprising:
a queue counter;
a count-down counter;
means for monitoring said request/acknowledge line for packet request signals and packet acknowledge signals asserted on said request/acknowledge line;
means, connected to said means for monitoring, for incrementing a count in said queue counter, whenever a packet request is signalled on said request/acknowledge line;
means, connected to said means for monitoring, for decrementing said count in said queue counter and a count in said count-down counter, whenever a packet acknowledge signal is asserted on said request/acknowledge line;
means for asserting on said request/acknowledge line, during one of a first plurality of predetermined time slots, a request to send data, said predetermined time slot being uniquely assigned to said computational unit;
means, connected to said queue counter and said count-down counter, for transferring said count in said queue counter to said count-down counter; and
means, connected to said count-down counter, for transmitting a data packet on said synchronous bus during a second plurality of predetermined time slots when said count in said count-down counter reaches zero.

7. A structure as in claim 6, further comprising means, connected to said means for transmitting, for asserting on said request/acknowledge line an end-of-message signal during the time slot when the last byte of said data packet is transmitted.

8. A structure as in claim 6, further comprising:
means, connected to said means for transmitting, for computing an error detecting code based on the content of said data packet; and
means, connected to said means for computing an error detecting code, for transmitting said error detecting code as the last byte in said data packet.

9. A structure as in claim 8, further comprising:
means for detecting a beginning of a data packet by monitoring data transmitted on said synchronous bus;
means, connected to said means for detecting, for determining from said beginning of a data packet an address representing a recipient of said data packet and for verifying that said address identifies said computational unit; and
means for receiving said data packet into a data buffer when said address identifies said computational unit.

10. A system comprising:
a synchronous bus having a request/acknowledge line; and
a plurality of computational units coupled to said synchronous bus, each computational unit having a bus interface circuit comprising:
a queue counter;
a count-down counter;
a monitor for detecting on said request/acknowledge line packet request signals and packet acknowledge signals asserted on said request/acknowledge line;
a circuit coupled to said queue counter and said count-down counter for incrementing a count in said queue counter, whenever a packet request is signalled on said request/acknowledge line and for decrementing said count in said queue counter and a count in said count-down counter, whenever a packet acknowledge signal is asserted on said request/acknowledge line;
a circuit coupled to said synchronous bus, said queue counter and said count-down counter for asserting on said request/acknowledge line, during one of a first plurality of predetermined time slots, a request to send data, said predetermined time slot being uniquely assigned to said compuational unit, and for transferring said count in said queue counter to said count-down counter; and a circuit coupled to said synchronous bus and said count-down counter for transmitting a data packet on said synchronous bus during a second plurality of predetermined time slots when said count in said count-down counter reaches zero.

11. A system as in claim 10, wherein said system further comprising a plurality of priority queues, each priority queue being associated with selected time slots in said first plurality of time slots and wherein some of said computation units each having a plurality of queue counters and corresponding count-down counters, each queue counter and corresponding count-down counter being associated with one of said priority queues.

12. A system as in claim 10, wherein said system further comprises a control unit for detecting in said system one of the conditions: (i) an integration of a new computational unit, and (ii) an inconsistent condition relating to said queue counters and said count-down counters in said bus interface circuits of said computational units; said control unit asserting a resynchronization signal on said synchronous bus in response to said detected condition during one of a third plurality of predetermined time slots.

13. A system as in claim 12, wherein each computational unit further comprising a circuit responsive to said resynchronization signal for resetting said queue counter and said count-down counter.

14. A system as in claim 12, wherein each computation unit further comprising an initialization circuit for enabling, when said computational circuit is first coupled to said synchronous bus, operation of a bus interface circuit in response to said resynchronization signal.

15. A method for use in a system having a synchronous bus with a request/acknowledge line, said method comprising:

providing a plurality of computational units coupled to said synchronous bus;

providing in each of said computational units a queue counter, and a count-down counter;

monitoring said synchronous bus to detect on said request/acknowledge line packet request signals and packet acknowledge signals asserted on said request/acknowledge line;

incrementing in each computational unit a count in said queue counter, whenever a packet request is signalled on said request/acknowledge line and decrementing in each computational unit said count in said queue counter and a count in said count-down counter, whenever a packet acknowledge signal is asserted on said request/acknowledge line;

for each computational unit having a data packet to send, asserting on said request/acknowledge line, during one of a first plurality of predetermined time slots, a request to send data, said predetermined time slot being uniquely assigned to said computational unit and for transferring said count in said queue counter of said computational unit to said count-down counter of said computational unit; and transmitting said data packet on said synchronous bus during a second plurality of predetermined time slots when said count in said count-down counter of said computational unit reaches zero.

16. A method as in claim 15, wherein said method provides in said system a plurality of priority queues, each priority queue being associated with selected time slots in said first plurality of time slots and wherein some of said computation units are each provided a plurality of queue counters and corresponding count-down counters, each queue counter and corresponding count-down counter being associated with one of said priority queues.

17. A method as in claim 16, wherein said method further comprises the steps of:

detecting in said system one of the conditions: (i) an integration of a new computational unit, and (ii) an inconsistent condition relating to said queue counters and said count-down counters in said bus interface circuits of said computational units; and asserting a resynchronization signal on said synchronous bus in response to said detected condition during one of a third plurality of predetermined time slots.

18. A method as in claim 17, further comprising the step of resetting in each computational unit said queue counter and said count-down counter in response to said resynchronization signal.

19. A method as in claim 17, further comprising the step of initializing a computational circuit is first coupled to said synchronous bus, said initializing step enables operation of a bus interface circuit after detecting a resynchronization signal on said synchronous bus.

* * * * *